United States Patent [19]

Maas, Jr. et al.

[11] 4,267,157

[45] May 12, 1981

[54] PROCESS OF PREPARING METAL PHOSPHORUS TRISULFIDES

[75] Inventors: Edward T. Maas, Jr., Kendall Park; John J. Steger, Scotch Plains, both of N.J.

[73] Assignee: Exxon Research and Engineering Company, Florham Park, N.J.

[21] Appl. No.: 103,536

[22] Filed: Nov. 14, 1979

[51] Int. Cl.$^3$ ............................................. C01B 25/14
[52] U.S. Cl. ..................................................... 423/303
[58] Field of Search ........................................... 423/303

[56] References Cited

U.S. PATENT DOCUMENTS 4,049,879  9/1977  Thompson et al. .................. 423/303

OTHER PUBLICATIONS

Taylor, Steger and Wold, "Preparation and Properties of Some Transition Metal Phosphorus Trisulfide Compounds", J. Solid State Chem., 7, pp. 461–467 (1973).
Steger, Wold and Kostiner, "Preparation and Properties of Iron Phosphorus Triselenide, FePSe$_3$", Inorganic Chemistry, vol. 13, No. 11, pp. 2719–2721 (1974).

*Primary Examiner*—O. R. Vertiz
*Assistant Examiner*—Wayne A. Langel
*Attorney, Agent, or Firm*—Edward M. Corcoran

[57] ABSTRACT

A process for producing relatively pure metal phosphorus trisulfides of the formula MPS$_3$ wherein M is a metal selected from the group consisting of Mg, Ca, Sr, V, Mn, Fe, Co, Ni, Pd, Zn, Cd, Hg, Sn, Pb, Sm, Eu, Yb and mixtures thereof, said process comprising contacting in a reaction zone, phosphides of said metals of the formula M$_x$P$_y$, wherein the ratio of y/x ranges between $\frac{1}{8}$ to 5/1, with one or more compounds of the formula PS$_z$ wherein z ranges from 1–3 and is preferably 2, said PS$_z$ being present in the reaction zone in an amount sufficient to exceed the amount of P and S stoichiometrically required to form the desired MPS$_3$, at a temperature ranging from about 300°–600° C. and confined so as to maintain the PS$_z$ present in the reaction zone as a gas in equilibrium with its liquid for a time sufficient to produce said relatively pure metal phosphorus trisulfide.

8 Claims, No Drawings

PROCESS OF PREPARING METAL PHOSPHORUS TRISULFIDES

BACKGROUND OF THE INVENTION

1. Field of the Invention

This invention relates to producing metal phosphorus trisulfides. More particularly, this invention relates to producing metal phosphorus trisulfide by reacting metal phosphides with phosphorus sulfides. Still more particularly, this invention is a process for producing relatively pure metal phosphorus trisulfides of the formula $MPS_3$ wherein M is a metal selected from the group consisting of Mg, Ca, Sr, V, Mn, Fe, Co, Ni, Pd, Zn, Cd, Hg, Sn, Pb, Sm, Eu, Yb and mixtures thereof, wherein phosphides of said metals are reacted with phosphorus trisulfides in a reaction zone at relatively mild reaction conditions, including a temperature ranging from about 300°–600° C. and wherein said phosphorus sulfides are present in the reaction zone at least in the liquid form and in an amount sufficient to exceed the amount of P and S stoichiometrically required to form the desired $MPS_3$.

2. Description of the Prior Art

Metal phosphorus trisulfides of the general formula $MPS_3$ are known in the art. In 1899 Ferrand (M. L. Ferrand *Concerning Some Metallic Sulfophosphides*, Ann. Chim. Phys., 17, 388–432 (1899).) prepared small quantities of phosphorus trisulfides of iron, nickel, zinc and lead by heating the metals or their sulfides with elemental phosphorus and sulfur or in the presence of phosphorus pentasulfide vapors to a cherry red heat (i.e., 700°–800° C.), but was unable to prepare the metal phosphorus trisulfides of manganese and cobalt. In all cases, the quantity of metal phosphorus trisulfides produced was extremely small, comprising small crystals often intimately mixed with other reaction products. As Ferrand noted, the production of side products along with the desired $MPS_3$ occurs almost invariably. These side products usually have chemical and physical properties very similar to those of the desired $MPS_3$ rendering separation of the side products from the $MPS_3$ virtually impossible or at least impractical. Thompson et al (U.S. Pat. No. 4,049,879) disclose the preparation of small quantities of iron, nickel and manganese phosphorus trisulfides by heating stoichiometric amounts of the elements, along with iodine, for at least 6 days at a temperature of about 700° C. As was the case with Ferrand, extremely small quantities (i.e., $\leq 1$ gram) of the metal phosphorus trisulfides were produced.

Hence, because of the potential importance and usefulness of metal phosphorus trisulfides as lubricants and electrode-active materials for batteries, there is a need for a method or process of producing these materials in larger quantities at reasonable reaction rates and under conditions and with starting materials such that any reaction products formed other than the desired $MPS_3$ are readily separated therefrom. These criteria are achieved with the process of the present invention.

SUMMARY OF THE INVENTION

What has now been discovered is a process for producing large quantities of relatively pure metal phosphorus trisulfides of the formula $MPS_3$ wherein M is a metal selected from the group consisting of Mg, Ca, Sr, V, Mn, Fe, Co, Ni, Pd, Zn, Cd, Hg, Sn, Pb, Sm, Eu, Yb and mixtures thereof, preferably Fe, Co, Ni, Hg, Zn, Cd, Pb and mixtures thereof and still more preferably Zn, Cd, Hg, Pb and mixtures thereof, said process comprising contacting in a reaction zone, phosphides of said metals of the formula $M_xP_y$ wherein the ratio of $y/x$ ranges from between $\frac{1}{8}$ to 5/1 with one or more liquid phosphorus sulfide compounds of the formula $PS_z$ wherein z ranges from 1–3 and is preferably 2, said $PS_z$ being present in the reaction zone in an amount sufficient to exceed the amount of P and S stoichiometrically required to form the desired $MPS_3$, at a temperature broadly ranging from about 300°–1000° C., and for a time sufficient to produce said relatively pure metal phosphorus trisulfide. Although the reaction will occur within the broad temperature range of from about 300°–1000° C., a preferred temperature range is from about 300°–600° C. and still more preferably from 450°–600° C. for a time ranging from about 2 to 72 hours and preferably from about 4 to 48 hours. These relatively mild reaction conditions are in marked contrast to those disclosed by the prior art which require temperature generally in excess of about 650° C. and which require relatively long reaction times ranging from about one week to 3 weeks or more. Further, the process of this invention is quite capable of preparing quantities of the $MPS_3$ metal phosphorus trisulfides in excess of one pound. This is also in marked contrast to the prior art processes which are not capable of producing quantities much in excess of 1 gram of the material.

As hereinbefore stated, the metals are added to the reaction zone in the form of metal phosphides wherein the phosphorus to metal ratio of said phosphides ranges from $\frac{1}{8}$ to 5/1. This is the starting metal phosphides will have the general formula of $M_8P$ to $MP_5$. Examples of metal phosphide starting materials useful in the process of this invention include $Mg_3P_2$, $Ca_3P_2$, $CaP$, $Sr_3P_2$, $SrP$, $Sr_4P_5$, $VP_3$, $V_3P$, $V_4P_3$, $Mn_3P_2$, $MnP$, $Mn_2P$, $Fe_2P$, $Fe_3P$, $FeP$, $FeP_2$, $Co_2P$, $CoP_2$, $CoP_3$ $CoP_4$, $Ni_{12}P_5$, $Ni_7P_3$, $NiP_2$, $Ni_2P$, $Ni_5P_2$, $Ni_5P_4$, $Pd_5P_2$, $Pd_6P$, $Pd_{4.8}P$, $Pd_8P$, $Zn_3P_2$, $ZnP_2$, $ZnP_4$, $Cd_7P_{10}$, $Cd_6P_7$, $Cd_3P_2$, $CdP_2$, $Cd_2P_3$, $SnP$, $Sn_{0.3}P$, $Sn_4P_3$, $PbP_5$, $SmP$, $EuP$, $YbP$ and $Hg_3P_2$. Although the prior art shows the use of elemental metal as one of the starting materials, metal phosphides are used as the starting materials in the process of this invention because it has been found that the use of elemental metal sometimes or often results in the preferrential formation of metal sulfides, some of which are fairly stable at the preferred conditions of temperature used in the process of this invention.

The metal phosphide starting material will be added to the reaction zone along with elemental phosphorus and sulfur or compounds of phosphorus and sulfur in an amount sufficient to exceed the stoichiometrically required amount of phosphorus and sulfur to form the desired $MPS_3$ and to insure the presence of one or more liquid compounds of the formula $PS_z$ in the reaction zone for contacting and reacting with the metal phosphide wherein z ranges from 1–3 and is preferably 2. If insufficient phosphorus and sulfur or compounds thereof are added to the reaction zone, other undesirable metal phosphosulfides are produced which usually have physical and chemical properties similar to those of the desired $MPS_3$. This makes it virtually impossible to separate them from the desired $MPS_3$. It is obvious to those skilled in the art that the reaction will be carried out under conditions of pressure sufficient to maintain at least part of the one or more $PS_z$ compounds present in the reaction zone in the liquid state.

The reaction zone itself may comprise any convenient non-reactive vessel. Pyrex glass is suitable for temperatures of less than about 500° C. In practice, it has been found convenient to charge the metal phosphide, sulfur and phosphorus into a Pyrex tube which is then evacuated, sealed and heated for time sufficient to form the desired $MPS_3$. The tube is then cooled and opened. When the tube is heated, the phosphorus and sulfur combine to form compounds of phosphorus and sulfur in the liquid form in equilibrium with their vapor species of the general composition $PS_z$ wherein z ranges from about 1 to 3, with a preferred composition of $PS_2$. It has been found that if the liquid phosphorus sulfides are present in the reaction zone in sufficient quantity so as to completely cover the solid metal phosphide in the reaction zone, much more rapid conversion of the metal phosphide to the pure $MPS_3$ occurs. This is explained due to a much greater concentration of phosphorus and sulfur on the surface of the metal phosphide as compared to the concentration of phosphorus and sulfur that would exist if the $PS_2$ was present in the reaction zone only in the gaseous form.

The said product coproduced will be a phosphorus sulfide of the formula $PS_z$ wherein the value of z is as has heretofore been stated. This side product is easily extracted from the desired $MPS_3$ reaction product by techniques well-known to those skilled in the art such as solvent extraction. Typical examples of suitable solvents include those known to dissolve elemental sulfur such as, for example, carbon disulfide, benzene, toluene, ethanol, diethyl ether, liquid ammonia, carbon tetrachloride, etc.

A typical reaction of the process of this invention is that of zinc phosphide plus phosphorus and sulfur which can be written as follows:

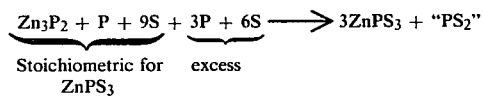

Stoichiometric for ZnPS₃     excess

In this typical reaction, zinc phosphide, sulfur and phosphorus are charged into a reactor completely filling up the space therein and the reactor is then sealed. The excess phosphorus and sulfur amount to one mole excess phosphorus and two moles excess sulfur per mole of zinc. The reaction is thus constrained in the volume such that the excess phosphorus and sulfur will form gaseous phosphorus sulfide species in equilibrium with their respective liquids and thus produce only $ZnPS_3$ and phosphorus sulfides as the reaction product. If the reaction were run at 500° C. where the saturation vapor pressure of $P_4S_7$ (the expected predominant species) is 190 torr, using the ideal gaseous expression of $PV=nRT$, it can be calculated based on $3(PS_2)$ formulations of $\frac{3}{4} P_4S_7 + \frac{3}{4}S$, a maximum free gas space in any conceivable reactor would be 178 liters using gram molar quantities of the reactants. Hence, at a volume of 178 liters or less of free gas space, if the gaseous $P_4S_7$ in this reaction is equilibrium with its liquid and the reaction carried out on the gram molar levels indicated, the reaction would yield the desired product provided that sufficient time were allowed for the reaction to go to completions. This is a rather large volume considering that the reactants and products on a molar basis each have a volume at room temperature of less than 0.5 liter. Hence, it would be reasonable to constrain this reaction into a one liter reactor so as to provide a large volume of liquid phosphorus sulfide phases in order to effectively increase the rate of reaction. It should be noted that if one reduces the amount of excess phosphorus and sulfur in the reaction, the same products will be produced as long as saturation vapor pressures are achieved so as to insure at least some of the $PS_z$ species present in the liquid state, but the rate of reaction will be considerably slower.

It is desirable to produce only phosphorus sulfides as the side products of the reaction because they are easily extracted, since they are soluble in solvents heretofore stated such as carbon disulfide, benzene and toluene. Another way of removing the phosphorus sulfides from the desired metal phosphorus sulfides is to hydrolyze the phosphorus sulfides with water which gives soluble phosphates and sulfides. $ZnPS_3$ is also susceptible to hydrolysis but at a much slower rate than the phosphorus sulfides. Thus, essentially pure $ZnPS_3$ can be recovered from the reaction zone by washing the products with water. If insufficient phosphorus and sulfur are employed in the reaction zone, it has been found that the reaction products include $ZnPS_3$, phosphorus sulfide and ZnS. When little or no excess phosphorus and sulfur are used, one of the reaction by products is $Zn_3(PS_4)_2$. Although it is relatively easy to separate phosphorus sulfides from metal phosphorus sulfides, it is difficult to separate, for example, ZnS or $Zn_3(PS_4)_2$ from the desired $ZnPS_3$, because the solubility of these materials are similar and extraction would be relatively meaningless. Further, zinc sulfide is more stable to hydrolysis than $ZnPS_3$, which means that one could not wash this impurity from the desired product with water.

The invention will be more readily understood by reference to the following examples.

EXAMPLE 1

In this experiment, 1.0 grams of $Zn_3P_2$, 0.30 grams of phosphorus and 1.49 grams of sulfur were intimately mixed and loaded into a Pyrex tube having a volume of approximately 8 cm³. The tube was evacuated to a pressure of approximately 25μ of Hg, sealed and placed in an oven at 482° C. for 44.5 hours after which the tube was removed from the furnace, cooled to room temperature and broken open. In this reaction, the excess phosphorus sulfur were present in a ratio of 0.5 moles of phosphorus and 1.0 moles of sulfur per mole of zinc. The overall reaction was as follows:

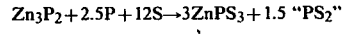

The solid mass recovered from the broken tube was ground up and extracted with toluene in a Soxhlet extractor until no more material could be extracted. A final extraction with carbon disulfide insured removal of any remaining phosphorus sulfides. The resulting white powder was analyzed with X-ray analysis and found to be pure $ZnPS_3$. The yield was quantitative.

EXAMPLE 2

In this experiment 2.58 grams of $Zn_3P_2$, 0.312 grams of phosphorus and 2.89 grams of sulfur were intimately mixed and placed in an 8 cm³ Pyrex tube which was evacuated, sealed and heated at 475° for about 48 hours after which the tube was cooled and broken open. The phosphorus and sulfur were present in the reaction zone in exact stoichiometric quantities required to produce the desired $ZnPS_3$ according to the following equation:

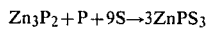

However, the solid product recovered from the broken tube was analyzed and found to consist of a mixture of small particles of $ZnPS_3$, a small percentage of $Zn_3(PS_4)$ and some ZnS.

EXAMPLE 3

1.43 g of $Fe_2P$, 0.93 g P and 3.21 g of S were mixed and placed in an 8 cm³ Pyrex tube which was sealed and heated to 480° C. for 42 hours after which the tube was cooled and opened. The stoichiometric reaction would be as follows:

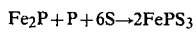

However, the quantities used provided excess sulfur and phosphorus in molar ratios of excess P/Fe=1.0 and excess S/Fe=2.0. The solid product produced was ground and extracted with $CS_2$. X-ray diffraction analysis of the product revealed that it was substantially pure $FePS_3$.

EXAMPLE 4

The experiment conducted in Example 3 was repeated using stoichiometric ratios of the reactants which were 1.43 g $Fe_2P$, 0.31 g P and 1.92 g S. The product was not extracted and X-ray diffraction revealed the product to be predominately $FePS_3$ along with a minor amount of FeS.

EXAMPLE 5

25.81 g $Zn_3P_2$, 12.39 g P and 48.10 g S were each individually ground, initially mixed and then placed in a Pyrex tube (volume ≈ 250 cm³) which was evacuated to a pressure of less than 100μ of Hg. The reactants were in an amount to each other so as to provide an excess of one mole of $PS_2$ in the tube. The vessel was then sealed, placed in a furnace at 475° C. for 48 hours, removed from the furnace, cooled and opened. The contents were removed, ground and extracted with carbon disulfide in a Soxhlet extractor, ground and extracted with carbon disulfide in a Soxhlet extractor until no further soluble products were removed. The yield of the desired $ZnPS_3$ product was essentially quantitative (57.75 gm). 28.53 g of mixed phosphorus sulfides were removed by the carbon disulfide extraction.

What is claimed is:

1. A process for producing metal phosphorus trisulfides of the formula $MPS_3$ wherein M is a metal selected from the group consisting of Mg, Ca, Sr, V, Mn, Fe, Co, Ni, Pd, Zn, Cd, Hg, Sn, Pb, Sm, Eu, Yb and mixtures thereof, said process comprising contacting, in a reaction zone, phosphides of said metals of the formula $M_xP_y$ wherein the ratio of y/x ranges between $\frac{1}{8}$ to 5/1 with one or more compounds of the formula $PS_z$ wherein z ranges from 1–3, said $PS_z$ being present in the reaction zone as a liquid in equilibrium with its vapor and in an amount sufficient to exceed the amount of P and S stoichiometrically required to form the desired $MPS_3$, for a time sufficient to produce said $MPS_3$.

2. The process of claim 1 wherein the temperature in the reaction zone ranges from between about 300° to 1,000° C.

3. The process of claim 2 wherein M is selected from the group consisting of Fe, Co, Ni, Hg, Zn, Cd, Pb and mixtures thereof.

4. The process of claim 2 wherein the temperature in the reaction zone ranges from about 300° to 600° C.

5. The process of claim 4 wherein M is selected from the group consisting of Zn, Cd, Hg, Pb and mixtures thereof.

6. The process of claim 4 wherein said temperature ranges from about 450° to 600° C. and wherein said time ranges between from about 2 to 72 hours.

7. The process of claim 5 or 6 wherein z is 2.

8. A process for producing metal phosphorus trisulfides of the formula $MPS_3$ wherein M is a metal selected from the group consisting of Fe, Co, Ni, Hg, Zn, Cd, Pb and mixtures thereof, said process comprising contacting, in a reaction zone at a temperature of from about 300° to 600° C., phosphides of said metals of the formula $M_xP_y$ wherein the ratio of y/x ranges between $\frac{1}{8}$ to 5/1 with one or more compounds of the formula $PS_z$ wherein z ranges from 1–3, said $PS_z$ being present in the reaction zone as a liquid in equilibrium with its vapor and in an amount sufficient to exceed the amount of P and S stoichiometrically required to form the desired $MPS_3$, for a time sufficient to produce said $MPS_3$ and without forming any metal sulfides as coproducts.

* * * * *